Patented Dec. 6, 1938

2,139,602

UNITED STATES PATENT OFFICE 2,139,602

METHOD OF RECLAIMING CATALYTIC MATERIAL FROM SPENT CATALYTIC MATERIAL

Murray Raney, Chattanooga, Tenn.

No Drawing. Application June 17, 1935,
Serial No. 27,129

15 Claims. (Cl. 23—238)

The present invention relates to the recovery of catalytic material from catalytic material which, after more or less use, has lost its catalytic activity in whole or has had it reduced to a point where it is no longer economical to use.

It is well known that processes for the recovery of catalytic material have been practiced in certain industries and on certain types of spent catalytic material. For example, nickel catalyst is largely used in the hydrogenation of edible and other oils and fats. After more or less use, its catalytic value is impaired to such a degree that it is no longer economical to use it. At this stage it is withdrawn from service and freed more or less from the oil or fat after which it is essentially finely divided nickel having very little catalytic value, due to whatever cause, but probably due to the presence of sulphides or a coating of some gummy or other substance.

Such finely divided nickel mixed with more or less oil or fat and some inert support such as filter-cel or kieselguhr may be treated with an acid such as sulphuric, whereupon the nickel goes into solution and is readily separated from the mass as nickel sulphate.

The preparation of nickel catalyst from a salt of nickel is well known in the art. Briefly, if the nickel sulphate obtained as described, is treated with a solution of sodium hydroxide, the nickel is precipitated in the form of nickel hydrate. The hydrate is then washed, dried and finally reduced with hydrogen gas to a mixture of metallic nickel and nickel oxides, which mixture has catalytic properties, and may be used until in the course of time its catalytic value is impaired to the point where it is no longer economical to use it.

In my Patents Nos. 1,563,587, Dec. 1, 1925, 1,628,190, May 10, 1927 and 1,915,473, June 27, 1933, I described methods for preparing catalytic materials. While catalytic materials prepared by these methods retain their activity for long periods of time and seem to be more resistant to whatever causes the loss of catalytic activity, it is true that in the course of time catalytic materials prepared by these methods lose their activity to a degree where it is no longer economical to use them.

In the processes described in the above patents, an alloy of the catalytic material with another material is prepared. This alloy may be treated with hydrogen gas preferably at elevated temperature and pressure and in presence of moisture, or it may be treated to dissolve said other material, or both treatments may be applied. The latter material is preferably a non-catalytic material such as, for instance, aluminum or silicon which can be separated from the catalytic material by a solvent such as caustic soda, sodium carbonate, or other non-acidic material, including also water.

Spent catalytic material resulting from catalysts prepared by the methods described in my patents may, if desired, be treated with an acid to obtain a salt of the metal or metals in the same manner as that described for obtaining nickel sulphate from spent nickel catalyst.

Up to this time, the use of the improved methods described in my patents have precluded the recovery of the spent catalytic material in any way except putting the metal or metals composing the spent catalyst into solution with an acid. Therefore, before my present invention, which I will now describe, the user of the improved methods for preparing catalytic material described in my patents had either to throw his spent catalytic material away or maintain two entirely different systems for preparing catalyst.

I have found that in general the finely divided metal or metals or their oxides resulting from spent catalytic material however prepared, may be readily recovered in the form of alloys of the catalytic materials and other materials, from which alloys catalytic materials may be prepared as described by the methods in my Patents Nos. 1,563,587, 1,628,910 and 1,915,473. The following examples will describe the procedure.

A sample of spent nickel catalyst which had been used for hydrogenating cotton seed oil was taken. The sample was a mixture of oil, nickel and filter-cel—a form of silica—used as a catalyst support. The sample was ignited and burned until the oil was all destroyed and the nickel oxidized so that the resulting ash was a mixture of nickel oxide and filter-cel. The amount of nickel in the ash was then determined by analysis and assumed to be the higher oxide of nickel $Ni_2O_3$ or $Ni_3O_4$. The ash was then mixed with borax glass for a flux and aluminum powder in amount required to reduce the nickel oxide present and to alloy with the nickel thus produced in a 50–50 nickel aluminum alloy. The mixture of ash and aluminum powder was placed in a crucible and a small amount of magnesium powder was placed on top of the mixture to act as a fuse. When the fuse was ignited a very vigorous reaction was started and in a few seconds all the nickel in the ash was alloyed with the aluminum and had settled to the bottom of the crucible and was covered by a layer of slag formed by the aluminum oxide, silica and borax glass. This alloy when treated by the methods described in my Patents Nos. 1,563,587, 1,628,190 and 1,915,473 produced a highly active and satisfactory catalyst.

I have found that it is desirable to free the spent catalyst from as much of the silica from the catalyst support as possible before reacting it with the aluminum. If this is done, a better slag is formed and of course there is less slag which increases the capacity of the crucible. One way in which a considerable amount of the carrier may be separated is to saponify the oil or fat in which the spent catalyst and support are mixed. A large amount of the carrier remains with the soap and the nickel settles out and may be separated and oxidized. For example, an ash prepared by burning a sample of spent catalyst in the fat, contained approximately 50% nickel. Ash prepared from exactly the same sample of material by saponifying the fat and then oxidizing the separated nickel contained 65% nickel and reacted better with the aluminum.

It is possible by carefully drying the nickel separated by saponifying the fat or extracting it with a solvent, to obtain it in a fairly pure metallic state which will alloy directly with aluminum. This is difficult to do and I prefer to thoroughly oxidize the sample which gives a better elimination of contained sulphur and produces a better separation of slag when reacted with aluminum. The nickel separated by saponifying the fat and without being oxidized, contains practically all the sulphur which is presumed to have caused the catalyst to lose its activity and which should be removed. Such sulphur when the nickel is reacted with aluminum seems to combine with the aluminum to form aluminum sulphide. When the nickel aluminum alloy so produced is treated with a solvent as described in my patents, the aluminum sulphide is broken down and hydrogen sulphide gas is liberated, leaving the corresponding amount of alumina mixed with the catalyst.

I also treat the mixture of finely divided nickel, filter-cel and oil or fat, oxidized or not, as desired, with sulphuric acid which treatment dissolves out the nickel in the form of nickel sulphate, which may readily be separated from the mass. If desirable, the nickel sulphate so produced may have any contained iron separated by selective precipitation. I then precipitate the nickel in sulphate solution with caustic soda, producing nickel hydrate. The hydrate so produced is washed, dried and heated up to about 800° F. producing the nickel oxide NiO. This nickel oxide is then reacted with aluminum in an amount sufficient to reduce the nickel oxide and to alloy in a 50-50 alloy with the nickel so produced as described for the oxide produced by burning the mixture of nickel, oil or fat and filter-cel.

I have recovered the nickel substantially in the pure state by all these methods and have made various alloys of nickel and aluminum by varying the amount of aluminum reacted with the nickel oxide. It is only necessary to calculate the amount of nickel which will be produced by the reduction of the nickel oxide and then add whatever amount of aluminum necessary to produce the alloy desired with that amount of nickel.

I have also used a mixture of silicon and aluminum for reducing the nickel oxide, and by adding extra amounts of silicon and aluminum over that required for the reduction, have produced various nickel-aluminum-silicon alloys which may be used for producing efficient catalysts as described in my patents.

I have also found it desirable to add calcium to the aluminum for the reduction of the oxide. Enough extra aluminum may be included in the mixture of aluminum and calcium to produce any desired alloy of the catalytic metal and aluminum. A mixture of 65% aluminum and 35% calcium gives a more fluid slag and apparently generates more heat than the aluminum alone. This effect is contrasted with the mixture of aluminum and silicon. The silicon seems to slow down the reaction.

Reduction of the oxide of the catalyst may be conducted with aluminum, silicon, and calcium. Sufficient silicon and aluminum is included so that there is produced an alloy including the reduced catalyst, silicon, and aluminum.

The methods described may be applied to a great many other metals or mixtures of metals, employed as catalysts. I have thus far mentioned only nickel. The methods described may be applied also to copper, chromium, iron and titanium, and others.

The methods described are new and novel ways for producing the alloys described in my aforesaid patents and are of great value, since materials are reclaimed which would otherwise be wasted.

I claim:

1. In a process of recovering catalytic metal from spent catalytic material and repreparing catalyst therefrom, oxidizing spent catalytic metal to an oxide of the metal, mixing together the resulting oxide and a quantity of metal having the property of reducing the oxide, and a sufficient excess to form an alloy with the catalytic metal, heating the resulting mixture to a temperature sufficiently high to cause the second named metal and the oxide to react to reduce the oxide and to form the alloy, and dissolving the said second named metal in a solvent that does not substantially affect the said catalytic metal.

2. In a process of recovering catalytic metal from spent catalytic material and repreparing catalyst therefrom, oxidizing spent catalytic metal to an oxide of the metal, mixing together the resulting oxide and aluminum in sufficient quantity to reduce the oxide and a sufficient excess to form an alloy with the catalytic metal, heating the resulting mixture to a temperature sufficiently high to cause the aluminum and the oxide to react to reduce the oxide and to form the alloy, and dissolving the aluminum in a solvent that does not substantially affect the said catalytic metal.

3. In a process of recovering catalytic metal from spent catalytic material and repreparing catalyst therefrom, oxidizing spent nickel catalytic material, mixing together the resulting oxide and aluminum in sufficient quantity to reduce the oxide and sufficient excess to form an alloy with the nickel, heating the resulting mixture to a temperature sufficiently high to cause the aluminum and the oxide to react to reduce the oxide and to form the alloy, and dissolving the aluminum in a solvent that does not substantially affect the nickel.

4. In a process of recovering catalytic metal from spent catalytic material and repreparing catalyst therefrom, oxidizing spent chromium catalytic material mixing together the resulting oxide and aluminum in sufficient quantity to reduce the oxide and sufficient excess to form an alloy with the chromium, heating the resulting mixture to a temperature sufficiently high to cause the aluminum and the oxide to react to reduce the oxide and to form the alloy, and dissolving the aluminum in a solvent that does not substantially affect the chromium.

5. In a process of recovering catalytic metal from spent catalytic material and repreparing catalyst therefrom, oxidizing spent copper catalytic material, mixing together the resulting oxide and aluminum in sufficient quantity to reduce the oxide and sufficient excess to form an alloy with the copper, heating the resulting mixture to a temperature sufficiently high to cause the aluminum and the oxide to react to reduce the oxide and to form the alloy, and dissolving the aluminum in a solvent that does not substantially affect the copper.

6. In a process of reclaiming a spent catalytic material and repreparing catalyst therefrom, at least partially separating spent metal catalyst from the materials in which it has been used, dissolving it in an acid to produce a salt of the catalytic metal, precipitating the salt with an alkali, washing, drying, and heating the precipitate to produce an oxide of the catalytic metal, mixing with the oxide aluminum in sufficient amounts to reduce the oxide and to form an alloy with the catalytic metal, heating the mixture to reduce the oxide and to form the alloy, and then removing aluminum from the alloy by treating the latter with a solvent for the said aluminum.

7. A process of reclaiming a spent catalytic material which process comprises at least partially separating spent metal catalyst from the materials in which it has been used, dissolving it in an acid to produce a salt of the catalytic metal, precipitating the salt with an alkali, washing, drying and heating the precipitate to produce an oxide of the catalytic metal, mixing with the oxide aluminum and silicon in sufficient amount to reduce the oxide and to form an alloy with the catalytic metal, heating the mixture to reduce the oxide and to form the alloy, and then removing aluminum and silicon from the alloy by treating the latter with a solvent for the said aluminum and silicon.

8. A process of reclaiming a spent catalytic material which process comprises at least partially separating spent metal catalyst from the materials in which it has been used, dissolving it in an acid to produce a salt of the catalytic metal, precipitating the salt with an alkali, washing, drying, and heating the precipitate to produce an oxide of the catalytic metal, mixing with the oxide aluminum and calcium in sufficient amount to reduce the oxide and to form an alloy with the catalytic metal, heating the mixture to reduce the oxide and to form the alloy, and removing non-catalytic material including aluminum from the catalytic metal by treating the alloy with a solvent for the said aluminum.

9. A process of reclaiming a spent catalytic material which process comprises at least partially separating spent metal catalyst from the materials in which it has been used, dissolving it in an acid to produce a salt of the catalytic metal, precipitating the salt with an alkali, washing, drying, and heating the precipitate to produce an oxide of the catalytic metal, mixing with the oxide aluminum, silicon and calcium in sufficient amount to reduce the oxide and to form an alloy with the catalytic metal, heating the mixture to reduce the oxide and to form the alloy, and then removing non-catalytic material including aluminum and silicon from the catalytic metal by treating the alloy with a solvent for the said aluminum, and silicon.

10. In a process of reclaiming a spent catalytic material and repreparing catalyst therefrom, at least partially separating spent metal catalyst from the materials in which it has been used, subjecting the spent metal catalyst to oxidizing conditions, treating the resulting oxidation product with an acid to produce a salt of the catalytic metal, precipitating the salt with an alkali, washing, drying, and heating the precipitate to produce an oxide of the catalytic metal, mixing with the oxide aluminum in sufficient amount to reduce the oxide and to form an alloy with the catalytic metal, heating the mixture to reduce the oxide and to form the alloy, and then removing aluminum from the alloy by treating the latter with a solvent for the said aluminum.

11. In a process of reclaiming a spent catalytic material and repreparing catalyst therefrom, at least partially separating spent metal catalyst comprising metal selected from a group consisting of nickel, copper, chromium, iron, and titanium, from the materials in which the said catalyst has been used, dissolving the said metal in an acid to produce a salt of the catalytic metal, precipitating the salt with an alkali, washing, drying, and heating the precipitate to produce an oxide of the catalytic metal, mixing with the oxide aluminum in sufficient amounts to reduce the oxide and to form an alloy with the catalytic metal, heating the mixture to reduce the oxide and to form the alloy, and then removing aluminum from the alloy by treating the latter with a solvent for the said aluminum.

12. A process of reclaiming a spent catalytic material which process comprises at least partially separating spent metal catalyst from the materials in which it has been used, said metal catalyst being selected from a group consisting of nickel, copper, chromium, iron, and titanium, dissolving the catalyst in an acid to produce a salt of the catalytic metal, precipitating the salt with an alkali, washing, drying and heating the precipitate to produce an oxide of the catalytic metal, mixing with the oxide aluminum and silicon in sufficient amount to reduce the oxide and to form an alloy with the catalytic metal, heating the mixture to reduce the oxide and to form the alloy, and then removing aluminum and silicon from the alloy by treating the latter with a solvent for the said aluminum and silicon.

13. A process of reclaiming a spent catalytic material which process comprises at least partially separating spent metal catalyst from the materials in which it has been used, said metal catalyst being selected from a group consisting of nickel, copper, chromium, iron, and titanium, dissolving the catalyst in an acid to produce a salt of the catalytic metal, precipitating the salt with an alkali, washing, drying, and heating the precipitate to produce an oxide of the catalytic metal, mixing with the oxide aluminum and calcium in sufficient amount to reduce the oxide and to form an alloy with the catalytic metal, heating the mixture to reduce the oxide and to form the alloy, and then removing non-catalytic material including aluminum from the catalytic metal by treating the alloy with a solvent for the said aluminum.

14. A process of reclaiming a spent catalytic material which process comprises at least partially separating spent metal catalyst from the materials in which it has been used, the said metal catalyst being selected from a group consisting of nickel, copper, chromium, iron, and titanium, dissolving the catalyst in an acid to produce a salt of the catalytic metal, precipitating the salt with an alkali, washing, drying, and heating the precipitate to produce an oxide of the catalytic metal, mixing with the oxide aluminum, silicon and calcium in sufficient amount to reduce the oxide and to form an alloy with the catalytic metal, heating the mixture to reduce the oxide and to form the alloy, and then removing non-catalytic material including aluminum and silicon from the catalytic metal by treating the alloy with a solvent for the said aluminum and silicon.

15. In a process of reclaiming a spent catalytic material and repreparing catalyst therefrom, at least partially separating spent metal catalyst from the materials in which it has been used, the said metal catalyst being selected from a group consisting of nickel, copper, chromium, iron, and titanium, subjecting the spent metal catalyst to oxidizing conditions, treating the resulting oxidation product with an acid to produce a salt of the catalytic metal, precipitating the salt with an alkali, washing, drying, and heating the precipitate to produce an oxide of the catalytic metal, mixing with the oxide aluminum in sufficient amount to reduce the oxide and to form an alloy with the catalytic metal, heating the mixture to reduce the oxide and to form the alloy, and then removing aluminum from the alloy by treating the latter with a solvent for the said aluminum.

MURRAY RANEY.